United States Patent
Yamaji et al.

(10) Patent No.: US 12,141,989 B2
(45) Date of Patent: Nov. 12, 2024

(54) ESTIMATING TRACKING DETERMINATION REGION BASED ON OBJECT STATE CHANGE EVENT COORDINATES

(71) Applicant: KABUSHIKI KAISHA TOSHIBA, Tokyo (JP)

(72) Inventors: Yuto Yamaji, Kawasaki (JP); Daisuke Kobayashi, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 371 days.

(21) Appl. No.: 17/668,905

(22) Filed: Feb. 10, 2022

(65) Prior Publication Data

US 2023/0062785 A1    Mar. 2, 2023

(30) Foreign Application Priority Data

Aug. 27, 2021    (JP) .................................. 2021-139338

(51) Int. Cl.
  *G06T 7/215*    (2017.01)
  *G06V 20/52*    (2022.01)
  *G06V 40/20*    (2022.01)

(52) U.S. Cl.
  CPC .............. *G06T 7/215* (2017.01); *G06V 20/52* (2022.01); *G06V 40/23* (2022.01); *G06T 2207/30196* (2013.01); *G06T 2207/30241* (2013.01)

(58) Field of Classification Search
  CPC ........... G06T 7/215; G06T 2207/30196; G06T 2207/30241; G06V 20/52; G06V 40/23;
(Continued)

(56) References Cited

U.S. PATENT DOCUMENTS

| 8,223,207 B2 * | 7/2012 | Baba ....................... G06T 7/277 348/169 |
| 10,621,423 B2 | 4/2020 | Yamamoto et al. |

(Continued)

FOREIGN PATENT DOCUMENTS

| CN | 112232271 A | * | 1/2021 | ......... G06K 9/00362 |
| CN | 112805730 A | * | 5/2021 | ............ B60W 40/04 |

(Continued)

OTHER PUBLICATIONS

A. A. G. Perera and A. Hoogs, "Bayesian object-level change detection in grayscale imagery," Proceedings of the 17th International Conference on Pattern Recognition, 2004. ICPR 2004., Cambridge, UK, 2004, pp. 71-75 vol. 1, doi: 10.1109/ICPR.2004.1334007 (Year: 2004).*

(Continued)

*Primary Examiner* — Michael Robert Cammarata
(74) *Attorney, Agent, or Firm* — Oblon, McClelland, Maier & Neustadt, L.L.P.

(57) ABSTRACT

An estimation apparatus includes one or more hardware processors configured to detect a first object included in time-series images, and generate a tracking trajectory of the first object; detect a state change event indicating an appearance, a disappearance, a bend, or a stay of the tracking trajectory, and extract a coordinate of the first object in which the state change event has occurred; and estimate a determination region based on the coordinate. Accordingly, the estimation apparatus is able to estimate more accurately an image region to be analyzed.

16 Claims, 12 Drawing Sheets

(58) Field of Classification Search
CPC ...... G06V 10/25; G06V 10/945; G06V 40/28; G06V 2201/07; G06V 10/62
See application file for complete search history.

(56) References Cited

U.S. PATENT DOCUMENTS

| | | | |
|---|---|---|---|
| 10,956,722 | B2 | 3/2021 | Yamamoto et al. |
| 2015/0070277 | A1* | 3/2015 | Kimura .................. G06V 40/28 345/156 |
| 2016/0349925 | A1* | 12/2016 | Kamamori .......... G06F 3/04883 |
| 2017/0039728 | A1* | 2/2017 | Bamba ................... G06V 20/52 |
| 2018/0137346 | A1* | 5/2018 | Mori ...................... G06V 40/20 |
| 2019/0050694 | A1* | 2/2019 | Fukagai ................. G06V 20/10 |
| 2019/0156491 | A1* | 5/2019 | Akiyama ............... G06V 20/53 |
| 2021/0118150 | A1* | 4/2021 | Jia ............................ G06T 7/246 |
| 2022/0012502 | A1* | 1/2022 | Klinkigt .................. G06N 3/08 |
| 2022/0114377 | A1* | 4/2022 | Subramanian ......... G06V 40/10 |
| 2022/0172480 | A1* | 6/2022 | Liu ......................... G06V 10/25 |
| 2022/0383535 | A1* | 12/2022 | Su ......................... G06V 10/443 |

FOREIGN PATENT DOCUMENTS

| | | | |
|---|---|---|---|
| JP | 2016-116137 A | 6/2016 | |
| JP | 2017-73642 A | 4/2017 | |
| JP | 2017-525064 A | 8/2017 | |
| JP | 6558579 B2 | 8/2019 | |
| JP | 2021-103811 A | 7/2021 | |
| KR | 100419777 B1 * | 2/2004 | |
| WO | WO-2011083572 A1 * | 7/2011 | .......... G01C 25/005 |
| WO | WO 2016/021121 A1 | 2/2016 | |

OTHER PUBLICATIONS

Kobayashi, et al. "Simultaneous Estimate of the Object Detection using Space, Sequential Attention and a Plurality of Object Chases" The 23rd Meeting on Image Recognition and Understanding (with Machine generated English translation), 13 pages.

Zhang, et al. Distribution-Aware Coordinate Representation for Human Pose Estimation, Proceedings of the IEEE/CVF conference on computer vision and pattern recognition, 2020, 18 pages.

* cited by examiner

ESTIMATING TRACKING DETERMINATION REGION BASED ON OBJECT STATE CHANGE EVENT COORDINATES

CROSS-REFERENCE TO RELATED APPLICATIONS

This application is based upon and claims the benefit of priority from Japanese Patent Application No. 2021-139338, filed on Aug. 27, 2021; the entire contents of which are incorporated herein by reference.

FIELD

Embodiments described herein relate generally to an estimation apparatus, an estimation method, and a computer program product.

BACKGROUND

There has been conventionally known a technique of estimating an image region to be analyzed, based on a tracking trajectory obtained by tracking the trajectory of an object appearing in an image captured by a monitoring camera or the like, and analyzing the image region.

DETAILED DESCRIPTION

According to an embodiment, an estimation apparatus includes one or more hardware processors configured to detect a first object included in time-series images, and generate a tracking trajectory of the first object; detect a state change event indicating an appearance, a disappearance, a bend, or a stay of the tracking trajectory, and extract a coordinate of the first object in which the state change event has occurred; and estimate a determination region based on the coordinate.

Hereinafter, embodiments of an estimation apparatus, an estimation method, and a program will be described in detail with reference to the attached drawings.

First Embodiment

First of all, the overview of an estimation apparatus according to the first embodiment will be described. An estimation apparatus 100 according to the first embodiment is used for counting the number of people who enter and leave a room, using images of a doorway that have been captured by a monitoring camera, for example. The doorway may be an entrance door of a room, or may be an elevator or the like. Note that an image to be input to the estimation apparatus according to the first embodiment may be an arbitrary image as long as the image includes an image region in which a person appears from an image region indicating the vicinity of the doorway, or a person disappears.

The estimation apparatus tracks a person, for example, and in a scene in which a tracking trajectory appears, determines that a person has entered an imaging range from a door or the like, and in a case where a tracking trajectory disappears, determines that a person has exited from a door or the like. The estimation apparatus estimates a region in which a tracking trajectory appears or disappears, for example, and uses the estimated region as a determination region. The estimation apparatus counts the number of people who enter and leave a room, by counting the number of tracking trajectories in a case where a tracking trajectory overlaps the determination region, or in a case where a tracking trajectory appears or disappears, for example, in the determination region.

Example of Functional Configuration

Figure 1:
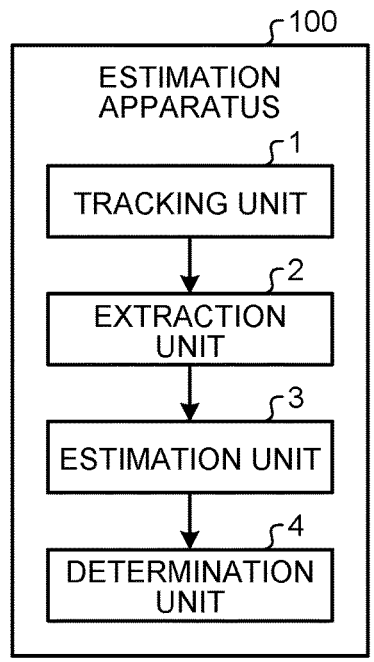
FIG. 1 is a diagram illustrating an example of a functional configuration of an estimation apparatus according to a first embodiment.

FIG. 1 is a diagram illustrating an example of a functional configuration of the estimation apparatus 100 according to the first embodiment. The estimation apparatus 100 according to the first embodiment includes a tracking unit 1, an extraction unit 2, an estimation unit 3, and a determination unit 4.

Overview of Each Unit

The tracking unit 1 tracks an object appearing in an image, in a time-series direction, and outputs a tracking trajectory.

The extraction unit 2 extracts a coordinate indicating the position of an object having a state change such as an appearance or a disappearance of a tracking trajectory. The coordinate indicating the position of an object is a coordinate or the like that indicates the position of a region for identifying a detected object, for example. For example, the region for identifying an object is a rectangle encompassing the object.

The estimation unit 3 estimates, as a determination region, a rectangle extracted by the extraction unit, or a region on which coordinates concentrate.

The determination unit 4 determines a tracking trajectory of an object within the determination region.

Details of Each Unit

The tracking unit 1 acquires time-series images such as a video captured by a camera, for example, detects an object from the images, and tracks the object by associating the object in the time-series direction. The tracking unit 1 uses the tracking method described in "The 23rd Meeting on image Recognition and Understanding", Daisuke Kobayashi, Tomoyuki Shibata "Object detection that uses spatial/time-series attention, and simultaneous estimation of multiple object tracking", for example. While an example of tracking a person will be described in the first embodiment, an object to be tracked is not limited to people.

The extraction unit 2 detects a state change event indicating an appearance, a disappearance, a bend, or a stay of a tracking trajectory, and extracts a coordinate of an object in which the state change event has occurred.

Figure 2:
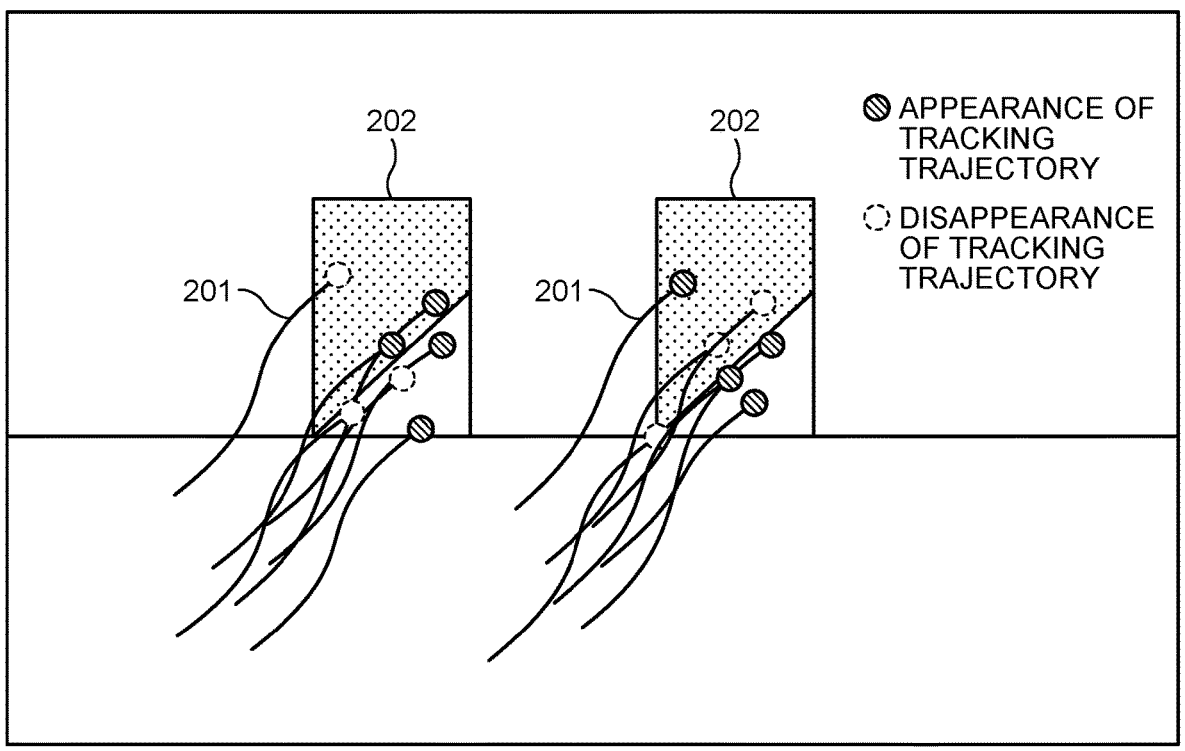
FIG. 2 is a diagram illustrating a detection example of a state change event according to the first embodiment.

FIG. 2 is a diagram illustrating a detection example of a state change event according to the first embodiment. FIG. 2 illustrates a case where an appearance or a disappearance (example of state change event) of a tracking trajectory 201 has occurred at a doorway 202. In the example illustrated in FIG. 2, the extraction unit 2 extracts, from a plurality of tracking trajectories 201 generated by the tracking unit 1, a coordinate indicating a position of a rectangle including a time point at which an appearance and a disappearance of a person occur, that is to say, a starting point of the tracking trajectory 201, and a coordinate indicating a position of a rectangle including an end point of the tracking trajectory 201.

Note that the extraction unit 2 may also extract a coordinate indicating a position of a rectangle including not only a starting point but also a point existing a plurality of frames after the starting point. Similarly, the extraction unit 2 may also extract a coordinate indicating a position of a rectangle including not only an end point but also a point existing a plurality of frames before the end point.

In addition, the extraction unit 2 may avoid generating a wrong region, by avoiding extracting a rectangle from a preset mask region. Similarly, the extraction unit 2 may avoid extracting a state change event at an image end because the tracking trajectory 201 breaks up at the image end.

Furthermore, in a case where the tracking unit 1 tracks a plurality of types of objects and detects an object other than an object to be extracted, the extraction unit 2 may avoid performing extraction near the object. Then, in a case where a distance between an object to be targeted by determination processing, and an object having a type different from the object to be targeted by determination processing is smaller than a threshold, the extraction unit 2 does not perform detection of a state change event. With this configuration, it is possible to prevent a determination region from being generated near a vehicle due to the tracking trajectory 201 breaking up in a case where a person passes behind the vehicle, for example.

The estimation unit 3 performs clustering using an extracted rectangle. The method of clustering may be an arbitrary method as long as the method can divide rectangles into clusters. The estimation unit 3 performs clustering by a Mean-shift clustering method, for example.

As a distance index of clustering, a distance between central coordinates of rectangles, an overlap rate of rectangles, or the like is used.

The estimation unit 3 estimates a determination region by generating a determination region from a rectangle (hereinafter, referred to as a "sample rectangle") included in a cluster generated by clustering. Note that the sample rectangle is not limited to a rectangle, and may be a sample region having an arbitrary shape.

Figure 3:
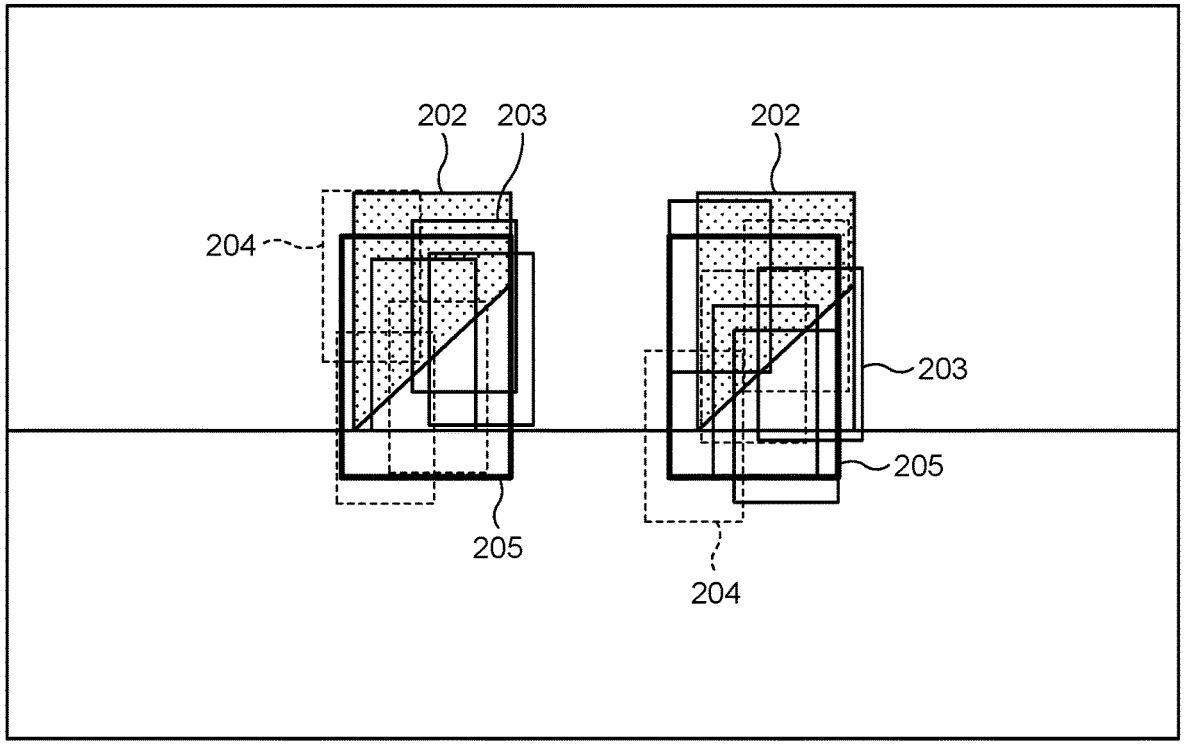
FIG. 3 is a diagram illustrating an example of an estimation method of a determination region according to the first embodiment.

FIG. 3 is a diagram illustrating an example of an estimation method of a determination region according to the first embodiment. For example, the estimation unit 3 generates, as a determination region 205, a region decided based on an average value of upper left coordinates of a sample rectangle 203 corresponding to the appearance of the tracking trajectory 201, and a sample rectangle 204 corresponding to the disappearance of the tracking trajectory 201, and an average value of lower right coordinates of the sample rectangles 203 and 204. The estimation unit 3 may perform enlargement processing at a fixed percentage on the determination region 205 generated from the sample rectangles 203 and 204, in such a manner as to reduce the number of tracking trajectories that are missed by the determination unit 4.

In addition, for example, the estimation unit 3 may generate the determination region 205 in such a manner as to encompass the plurality of sample rectangles 203 and 204. Specifically, for example, the estimation unit 3 may generate the determination region 205 in such a manner as to encompass a distribution of central coordinates on an image, using central coordinates of the plurality of sample rectangles 203 and 204.

In addition, for example, the estimation unit 3 may separate an image into a grid shape, extract a grid on which coordinates concentrate, by allocating central coordinates and rectangle regions to grids, and estimate the extracted grid as the determination region 205.

Figure 4:
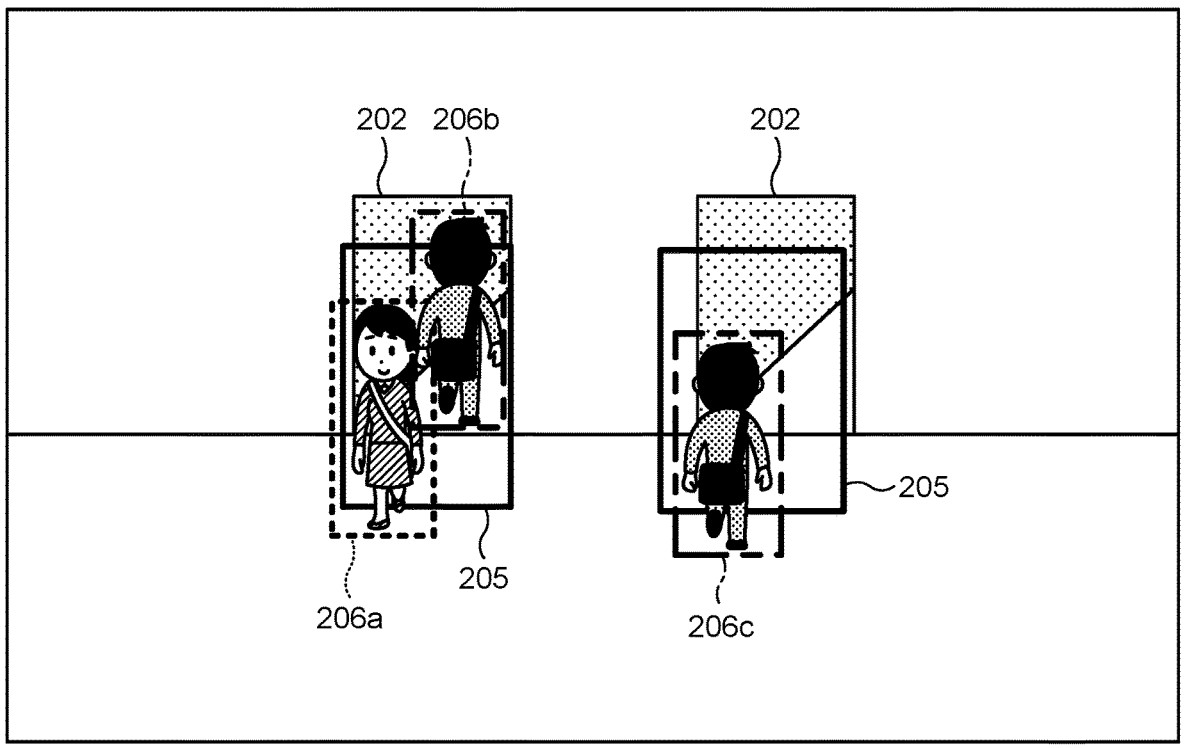
FIG. 4 is a diagram illustrating an example of a determination method in a determination region according to the first embodiment.

FIG. 4 is a diagram illustrating an example of a determination method in the determination region 205 according to the first embodiment. Using the tracking trajectory 201 and the determination region 205, the determination unit 4 determines at least one of the entry of an object and the occurrence of a state change event.

For example, the determination unit 4 obtains an overlap rate of each of detection rectangles 206a to 206c of objects (persons in the first embodiment) corresponding to the tracking trajectories 201, with respect to the determination region 205, and in a case where the overlap rate is larger than a preset threshold, determines that an object has entered the determination region 205.

Note that a determination method may be a method of determining that an object has entered the determination region 205, in a case where a central coordinate of any of the detection rectangles 206a to 206c is encompassed in the determination region 205, aside from an overlap rate. In addition, for example, only whether or not a state change event of the tracking trajectory 201 has occurred within the determination region 205 may be determined. In the example illustrated in FIG. 4, the detection rectangle 206a of an object having the tracking trajectory 201 having appeared, and the detection rectangles 206b and 206c of objects having the tracking trajectories 201 having disappeared are used in the determination in the determination region 205.

The determination unit 4 may target the tracking trajectory 201 newly started to be tracked after the determination region 205 is estimated, and may also include the tracking trajectory 201 used for estimating the determination region 205, into determination targets.

Lastly, in a case where entry into the determination region 205 is detected, the determination unit 4 outputs that an entry state has been detected. In addition, the determination unit 4 may count the number of times of entry, and output the counted number. Furthermore, in a case where the determination unit 4 determines a state change event in the determination region 205, and counts the number of times a state change event is determined, the determination unit 4 may separately count the number of times for each type of a state change event (an appearance, a disappearance, a bend, or a stay).

Example of Estimation/Determination Processing

Figure 5:
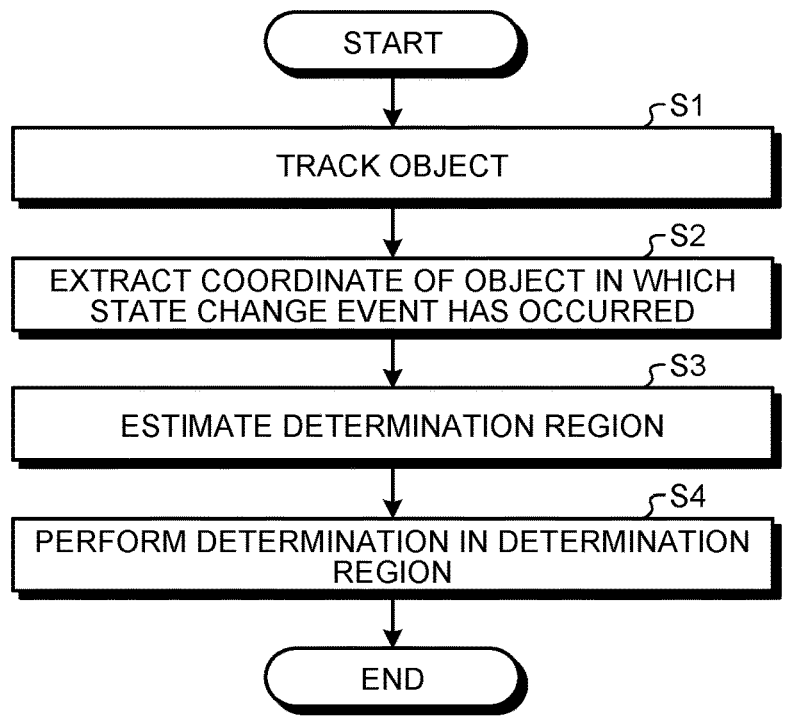
FIG. 5 is a flowchart illustrating an example of estimation/determination processing according to the first embodiment.

FIG. 5 is a flowchart illustrating an example of estimation/determination processing according to the first embodiment. First of all, the tracking unit 1 detects an object included in time-series images, and generates the tracking trajectory 201 of the object (Step S1). Next, the extraction unit 2 detects a state change event indicating an appearance, a disappearance, a bend, or a stay of the tracking trajectory 201, and extracts a coordinate of an object in which the state change event has occurred (for example, a coordinate indicating a position of the detection rectangle 206 encompassing the object) (Step S2).

Next, the estimation unit 3 estimates the determination region 205 based on the coordinate extracted in Step S2 (Step S3). Next, the determination unit 4 performs at least one of processing of determining whether or not an object has entered the determination region 205 from outside the determination region 205, and processing of determining whether or not a state change event in the determination region 205 has occurred (Step S4).

Heretofore, as described above, according to the estimation apparatus 100 of the first embodiment, it is possible to more accurately estimate an image region to be analyzed (the determination region 205 in the description of the first embodiment). For example, analysis such as the counting of the number of people who enter or leave a room from the doorway 202 can be performed using the determination region 205 automatically estimated accurately, without manually setting the determination region 205.

Conventionally, it has been necessary to manually set a number count line, or it has been necessary to present a recommended region in such a manner that a number count line can be easily set manually. In the prior art, for example, a region through which the tracking trajectories 201 redundantly pass is obtained, and one point cannot be selected from the tracking trajectories 201. Thus, it has been difficult to automatically decide a number count line to be determined, from the perspective of the structure of counting the number of people based on the passage through a number count line.

On the other hand, according to the estimation apparatus 100 of the first embodiment, by collecting coordinates at which a state change event of the tracking trajectory 201 has occurred, and obtaining a region on which the coordinates with the occurrence of a state change event concentrate, as the determination region 205, it is possible to automatically estimate the determination region 205.

By tracking a person, in a scene in which the tracking trajectory 201 appears, it can be determined that a person has entered an imaging range from a door or the like, and in a case where the tracking trajectory 201 disappears, it can be determined that a person has exited from a door or the like. A region in which the tracking trajectory 201 appears or disappears can be estimated to be a doorway, and the number of people who enter or leave a room can be counted using the region.

In addition, when a hand of a person is tracked in a video obtained by capturing an image of a work table, for example, in a scene in which the tracking trajectory 201 bends, it can be determined that a component existing at a distance has been acquired, and in a scene in which the tracking trajectory 201 stays, it can be determined that a person is assembling components in a work region at hand. A region in which the tracking trajectory 201 bends or stays can be estimated to be a component region or a work region at hand, and by determining the position of the hand or the tracking trajectory 201 using the region, work analysis of an assembly work or the like can be performed.

Note that the details of the operations performed in the case of tracking a hand of a person will be described in a third embodiment.

In this manner, by collecting coordinates with state changes from among the tracking trajectories 201, and obtaining a region on which coordinates concentrate, a doorway region or a region necessary for work analysis can be estimated, and digitization can be performed without manually setting a region.

Second Embodiment

Next, the second embodiment will be described. In the description of the second embodiment, description similar to the first embodiment will be omitted, and a point different from the first embodiment will be described.

In the second embodiment, the description will be given of an example of measuring the number of incoming and outgoing passengers of a moving object such as a vehicle, by detecting a plurality of types of objects and tracking the objects by the tracking unit 1.

The tracking unit 1 detects objects with different types such as a bus and a person, for example, and individually tracks the objects.

Example of Functional Configuration

Figure 6:
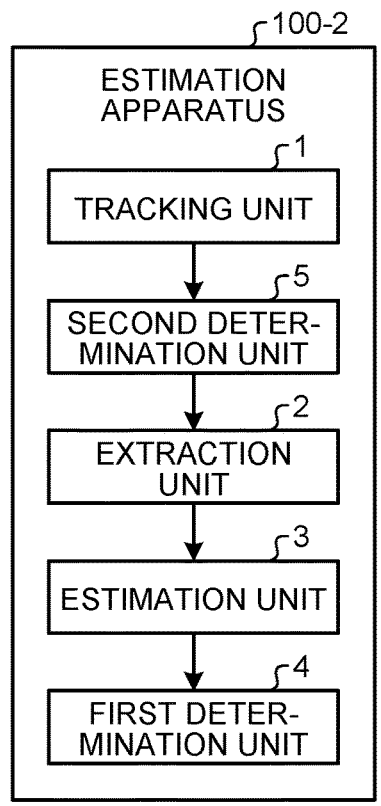
FIG. 6 is a diagram illustrating an example of a functional configuration of an estimation apparatus according to a second embodiment.

FIG. 6 is a diagram illustrating an example of a functional configuration of an estimation apparatus 100-2 according to the second embodiment. The estimation apparatus 100-2 according to the second embodiment includes a tracking unit 1, an extraction unit 2, an estimation unit 3, a first determination unit 4, and a second determination unit 5. The first determination unit 4 corresponds to the determination unit 4 according to the first embodiment, and in the second embodiment, the second determination unit 5 is newly added.

First of all, the tracking unit 1 according to the second embodiment individually detects a first object such as a person, and a second object such as a bus, and individually tracks the objects.

The second determination unit 5 calculates a time-series movement amount of a tracking trajectory 201 of the second object, and determines that the second object remains stationary, in a case where a time during which the movement amount is equal to or smaller than a threshold becomes a fixed time or more.

In a case where it is determined by the second determination unit 5 that the second object has remained stationary, the extraction unit 2 performs extraction of a coordinate of a first object where a state change event of the tracking trajectory 201 has occurred within a detected region of the second object, or near the detected region of the second object.

Similarly to the first embodiment, the estimation unit 3 performs estimation processing of a determination region 205 using the first object as a determination target.

Figure 7:
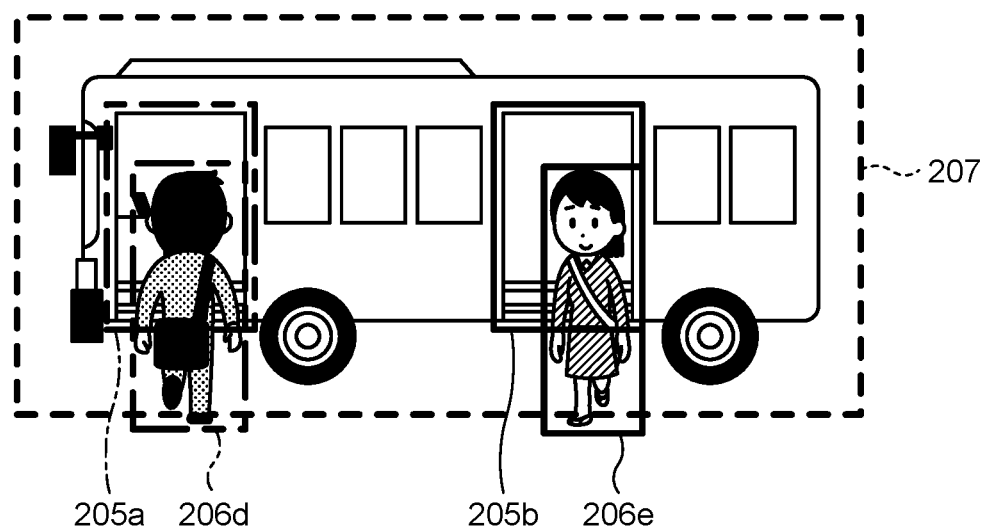
FIG. 7 is a diagram illustrating an example of a determination method in a determination region according to the second embodiment.

FIG. 7 is a diagram illustrating an example of a determination method in determination regions 205a and 205b according to the second embodiment. The determination regions 205a and 205b are regions in which it is determined whether or not a state change event of the tracking trajectories 201 of the first objects (persons in the example illustrated in FIG. 7) detected by detection rectangles 206d and 206e has occurred. A detection rectangle 207 is a region in which the second object (bus in the example illustrated in FIG. 7) is detected. Note that the detection rectangle 207 is not limited to a rectangle, and may be a region having an arbitrary shape.

The first determination unit 4 separately performs counting within the determination regions 205a and 205b by determining that a person has got into the second object, in a case where the tracking trajectory 201 disappears, and determining that a person has got off, in a case where the tracking trajectory 201 appears.

The second determination unit 5 calculates a time-series movement amount of the tracking trajectory 201 of the second object, and determines that the second object has started to move from a stationary state, when a time during which the movement amount is larger than a threshold becomes a fixed time or more.

In a case where the second object has started to move from a stationary state, the estimation unit 3 deletes the determination regions 205a and 205b.

With this configuration, for example, when a bus departs, the unneeded determination regions 205a and 205b can be deleted.

Example of Estimation/Determination Processing

Figure 8:
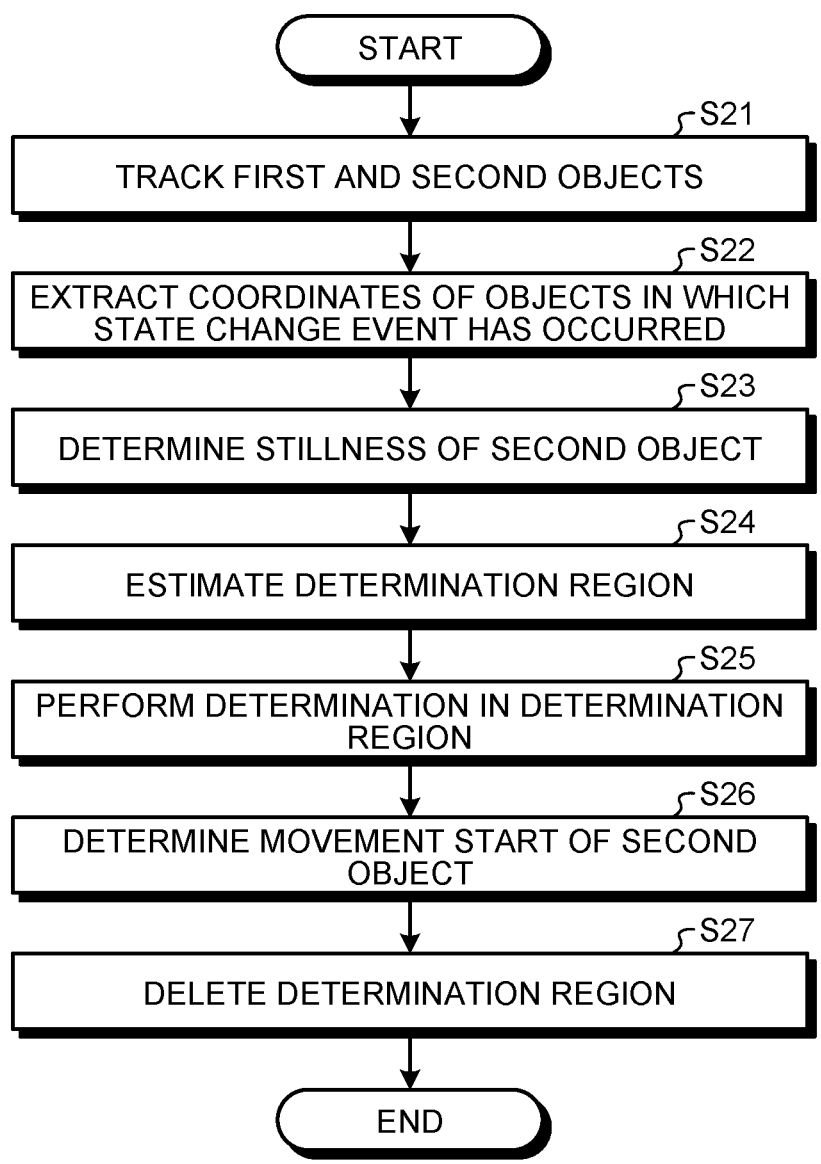
FIG. 8 is a flowchart illustrating an example of estimation/determination processing according to the second embodiment.

FIG. 8 is a flowchart illustrating an example of estimation/determination processing according to the second embodiment. First of all, the tracking unit 1 detects first and second objects included in time-series images, and generates tracking trajectories 201 of the first and second objects (Step S21).

Next, the extraction unit 2 detects a state change event indicating an appearance, a disappearance, a bend, or a stay of the tracking trajectory 201, and extracts coordinates of the first and second objects in which the state change event has occurred (Step S2).

Next, the second determination unit 5 determines the stillness of the second object based on the stay of the tracking trajectory 201 of the second object (Step S23).

Next, the estimation unit 3 estimates the determination region 205 based on the coordinate of the first object in which a state change event (an appearance and a disappearance in the example illustrated in FIG. 7) has occurred (Step S24).

Next, the first determination unit 4 performs at least one of processing of determining whether or not an object has entered the determination region 205 from outside the determination region 205, and processing of determining whether or not a state change event (an appearance and a disappearance in the example illustrated in FIG. 7) in the determination region 205 has occurred (Step S25).

Next, the second determination unit 5 calculates a time-series movement amount of the tracking trajectory 201 of the second object, and determines a movement start of the second object based on whether or not a time during which the movement amount is larger than a threshold becomes a fixed time or more (Step S26).

Next, in a case where the movement of the second object has started, that is to say, in a case where the second object has started to move from a stationary state, the estimation unit 3 deletes the determination region 205 (Step S27).

Heretofore, as described above, as for a second object such as a bus, the estimation apparatus 100-2 according to the second embodiment generates the determination region 205 at a timing at which the second object comes to rest for a person getting into or getting off from the second object, and deletes the determination region 205 at a timing at which the second object departs. With this configuration, for example, the number of people who get into or get off from a bus can be measured for each bus.

In addition, because the estimation apparatus 100-2 according to the second embodiment determines a stationary state of the second object and then generates the determination region 205, the estimation apparatus 100-2 can count the number of people as for an arbitrary moving second object. It is possible to solve the conventional issue in which only a standardized region in an image can be determined.

Third Embodiment

Next, the third embodiment will be described. In the description of the third embodiment, description similar to the first embodiment will be omitted, and a point different from the first embodiment will be described.

In the third embodiment, the description will be given of an example of performing estimation of a determination region (work region) used in work analysis, by tracking a skeletal point of a person.

Example of Functional Configuration

Figure 9:
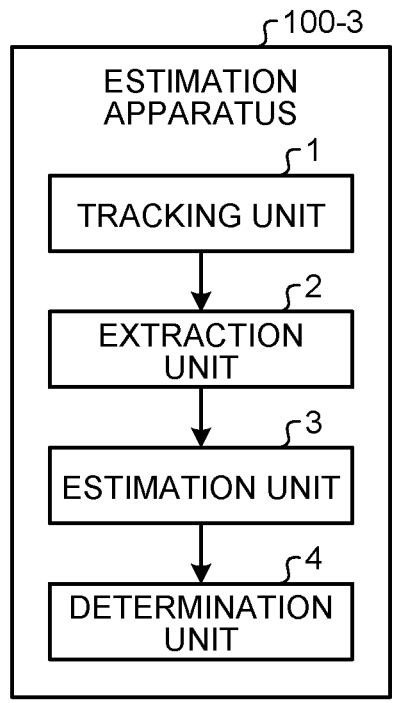
FIG. 9 is a diagram illustrating an example of a functional configuration of an estimation apparatus according to a third embodiment.

FIG. 9 is a diagram illustrating an example of a functional configuration of an estimation apparatus 100-3 according to the third embodiment. The estimation apparatus 100-3 according to the third embodiment includes a tracking unit 1, an extraction unit 2, an estimation unit 3, and a determination unit 4.

The tracking unit 1 performs detection of a person and also performs detection of a skeletal point of the person. For the detection of a skeletal point, for example, a method described in Zhang, Feng, et al. "Distribution-aware coordinate representation for human pose estimation" "Proceedings of the IEEE/CVF conference on computer vision and pattern recognition", 2020 is used. The tracking unit 1 tracks a person, and tracks each skeletal point by detecting a skeletal point of the person.

As for a tracking trajectory 201 of a skeletal point of a hand, the extraction unit 2 extracts coordinates indicating the positions of the hand having a state change event indicating a bend, and a state change event indicating a stay.

Figure 10:
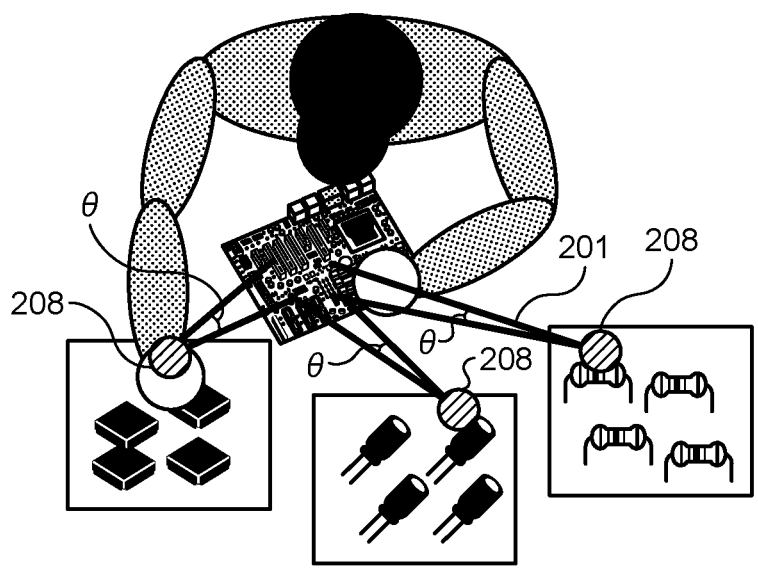
FIG. 10 is a diagram for describing an example of an assembly work according to the third embodiment.
Figure 11:
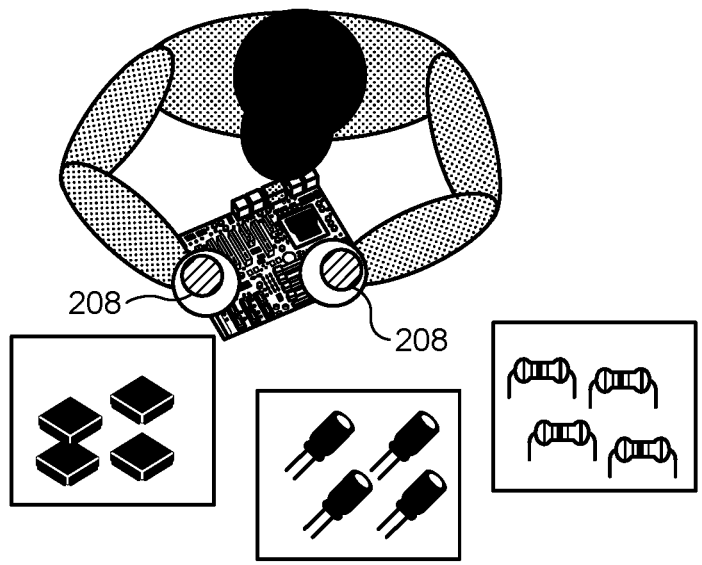
FIG. 11 is a diagram for describing an example of an assembly work according to the third embodiment.

FIGS. 10 and 11 are diagrams for describing an example of an assembly work according to the third embodiment. Specifically, the extraction unit 2 extracts, as one set, three frames among the tracking trajectories 201 of a skeletal point 208 of a hand, and calculates an angle θ formed by a line segment connecting a skeletal point A of a frame t−1 and a skeletal point B of a frame t, and a line segment connecting the skeletal point B of the frame t and a skeletal point C of a frame t+1.

Then, if the angle θ formed by the line segments is smaller than a threshold, the extraction unit 2 detects the bend of the tracking trajectory 201 of the skeletal point 208 of the hand.

In the calculation of the formed angle θ, for reducing the influence of an error of a detected position of the skeletal point 208, a coordinate of a frame existing several frames before or after a frame to be subjected to bend determination may be used.

As for the stay, the extraction unit 2 calculates a time-series movement amount of the skeletal point 208 of the hand, and if a time during which the movement amount is smaller than a threshold is a fixed time or more, detects the stay of the tracking trajectory 201 of the skeletal point 208 of the hand.

Because an assembly work is often performed using both hands, as for the stay, the extraction unit 2 may detect a stay in a case where a skeletal point 208 of a left hand and a skeletal point 208 of a right hand simultaneously remain.

In addition, the extraction unit 2 may calculate a distance between both hands, and detect a stay only in a case where the distance is equal to or smaller than a fixed value. Furthermore, in a case where a hand stays for a long time, the hand is considered to be in a state of waiting for another work. Thus, in a case where a stay time becomes a fixed time or more, the extraction unit 2 may avoid detecting the state as a state change event of a stay.

Figure 12:
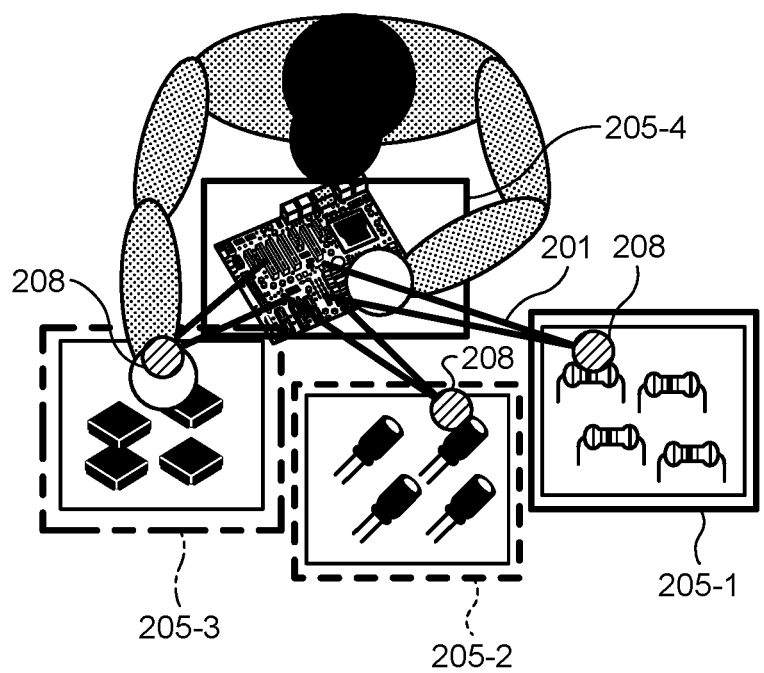
FIG. 12 is a diagram for describing an example of estimation/determination processing according to the third embodiment.
Figure 13:
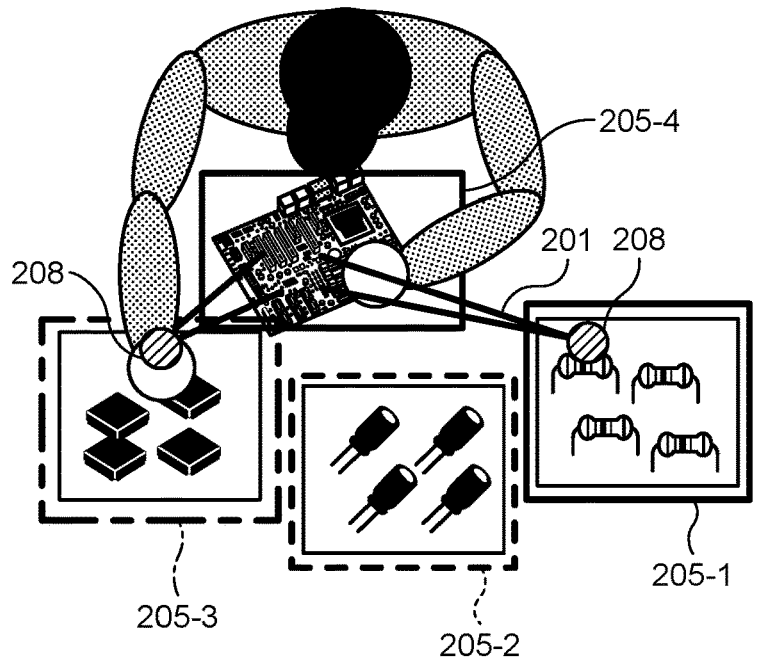
FIG. 13 is a diagram for describing an example of estimation/determination processing according to the third embodiment.

FIGS. 12 and 13 are diagrams for describing an example of estimation/determination processing according to the third embodiment.

For example, in the case of an assembly work, components are acquired from a component region existing at a distance, and the assembly of components is repeated in a work region at hand. When a component is acquired from a component region, the tracking trajectory 201 of the skeletal point 208 of the hand becomes a trajectory of stretching from a hand region toward the component region, and then acquiring a component and returning to the hand region, and it can be determined that the component region exists at a bend position of the tracking trajectory 201. In addition, it can be determined that a location where the tracking trajectory 201 of the hand stays is an assembly work region at hand.

Similarly to the first embodiment, the estimation unit 3 estimates determination regions 205-1 to 205-3 indicating component regions, from coordinates indicating the bend of the skeletal point 208 of the hand that have been extracted by the extraction unit 2. In addition, the estimation unit 3 estimates a determination region 205-4 indicating a work region at hand, from coordinates indicating the stay of the skeletal point 208 of the hand that have been extracted by the extraction unit 2.

Note that, as for stay, the estimation unit 3 may estimate the determination region 205-4 in such a manner as to encompass coordinates of the skeletal points 208 of both hands at the time of stay (refer to FIG. 11). In this case, for example, the estimation unit 3 estimates the determination regions 205-1 to 205-3 as one hand regions in which a state change event of only the skeletal point 208 included in one hand of a person occurs, and estimates the determination region 205-4 as a both hand region in which a state change event of the skeletal points 208 of both hands of the person occurs.

The determination unit 4 determines entry of a hand into the plurality of determination regions 205-1 to 205-4, and the bend and stay of the tracking trajectory 201 of the skeletal point 208 of the hand. With this configuration, the determination unit 4 measures the number of times a component is acquired (the number of times the hand enters the determination regions 205-1 to 205-3), an acquisition time, detects an error in acquisition order, and measures a work time in a work region (the determination region 205-4).

In addition, the determination unit 4 may set an order of the determination regions 205-1 to 205-4, and determine whether the hand enters the determination regions in accordance with the set order. The determination unit 4 may obtain an order in which the hand enters the determination regions 205-1 to 205-4, based on the trajectory of the tracked hand, and automatically set an order of the determination regions 205-1 to 205-4.

In a case where the plurality of tracking trajectories 201 has different entry orders of the determination regions 205-1 to 205-4, for example, as illustrated in FIG. 12, the determination unit 4 may employ a normal order (the determination region 205-4→the determination region 205-1→ the determination region 205-4→the determination region 205-2→the determination region 205-4→the determination region 205-3→the determination region 205-4).

Furthermore, for example, as illustrated in FIG. 13, in a case where an entry order varies from a normal entry order of hand (the determination region 205-4→the determination region 205-1→the determination region 205-4→the determination region 205-3→the determination region 205-4), the determination unit 4 detects a procedure error, and outputs the error.

Example of Estimation/Determination Processing

Figure 14:
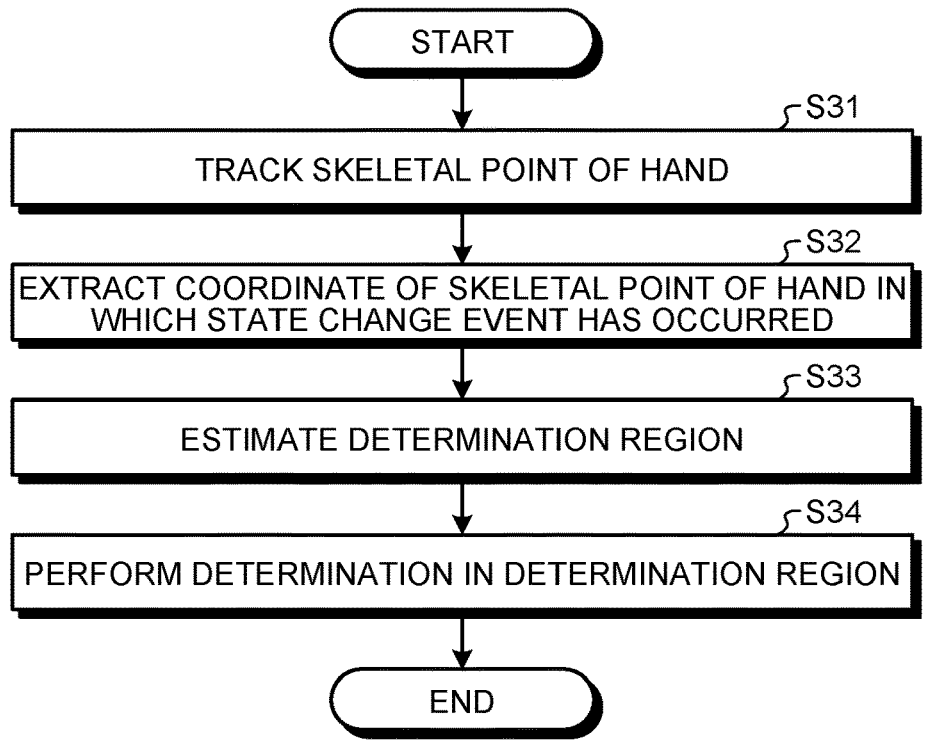
FIG. 14 is a flowchart illustrating an example of estimation/determination processing according to the third embodiment.

FIG. 14 is a flowchart illustrating an example of estimation/determination processing according to the third embodiment. First of all, the tracking unit 1 detects a skeletal point 208 of a hand included in time-series images, and generates a tracking trajectory 201 of the skeletal point 208 of the hand (Step S31). Next, the extraction unit 2 detects a state change event indicating a bend or a stay of the tracking trajectory 201, and extracts a coordinate of the skeletal point 208 of the hand in which the state change event has occurred (Step S32).

Next, the estimation unit 3 estimates the determination region 205 based on the coordinate extracted in Step S32 (Step S33).

Next, the determination unit 4 performs processing of determining whether or not an object has entered the determination region 205 from outside the determination region 205, and processing of determining whether or not a state change event in the determination region 205 has occurred (Step S34). With this configuration, the determination unit 4 measures the number of times a component is acquired, an acquisition time, detects an error in acquisition order, and measures a work time in a work region.

Heretofore, as described above, according to the third embodiment, a work time can be measured without manually setting a component region and a work region in an assembly work.

Note that an object to be tracked may be an object other than a person. For example, in the case of tracking a vehicle appearing in an image captured by a camera installed in a parking, by estimating the determination region 205 assuming that a location where an object stays for a long time is a parking region, and determining the entry of a vehicle, parking percentage measurement of the parking and full determination can be performed.

Fourth Embodiment

Next, the fourth embodiment will be described. In the description of the fourth embodiment, description similar to the second embodiment will be omitted, and a point different from the second embodiment will be described.

In the fourth embodiment, the description will be given of the case of performing the display of the determination region 205, parameter setting of the determination region 205, and the display of a determination result.

Example of Functional Configuration

Figure 15:
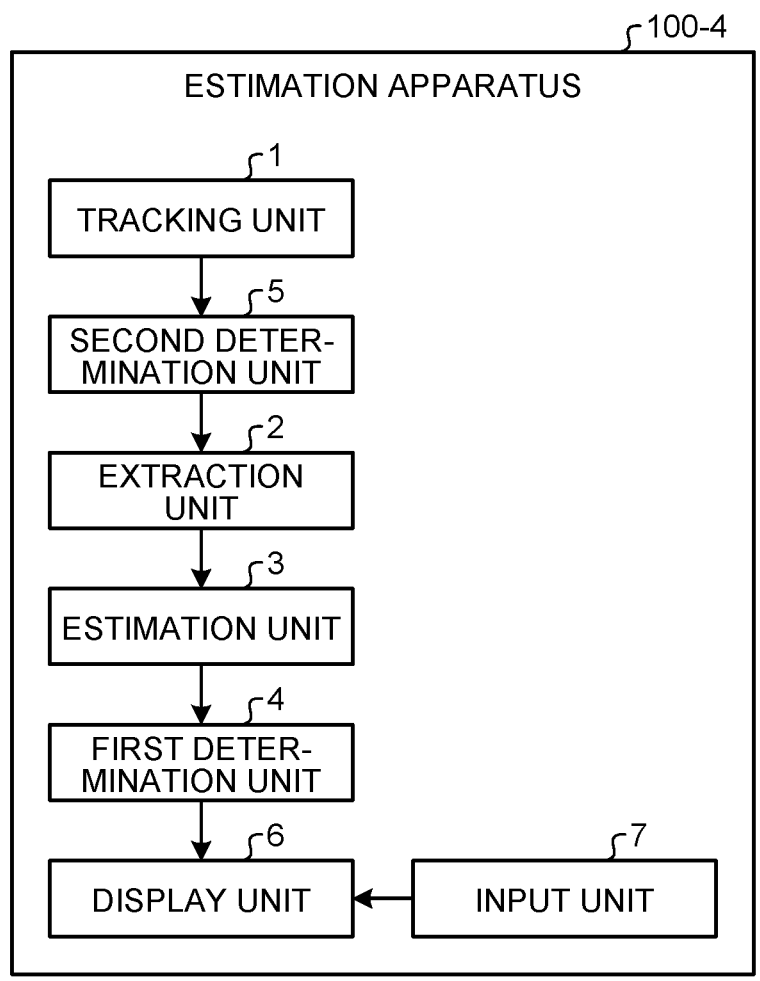
FIG. 15 is a diagram illustrating an example of a functional configuration of an estimation apparatus according to a fourth embodiment.

FIG. 15 is a diagram illustrating an example of a functional configuration of an estimation apparatus 100-4 according to the fourth embodiment. The estimation apparatus 100-4 according to the fourth embodiment includes a tracking unit 1, an extraction unit 2, an estimation unit 3, a first determination unit 4, a second determination unit 5, a display unit 6, and an input unit 7. In the fourth embodiment, the display unit 6 and the input unit 7 are newly added.

The display unit 6 displays displayed information for receiving an operation such as the correction of a determination region 205, the choice to enable or disable the determination region 205, and deletion of the determination region 205.

The input unit 7 receives an input operation on an input field, a checkbox, and the like that are displayed in displayed information.

Figure 16:
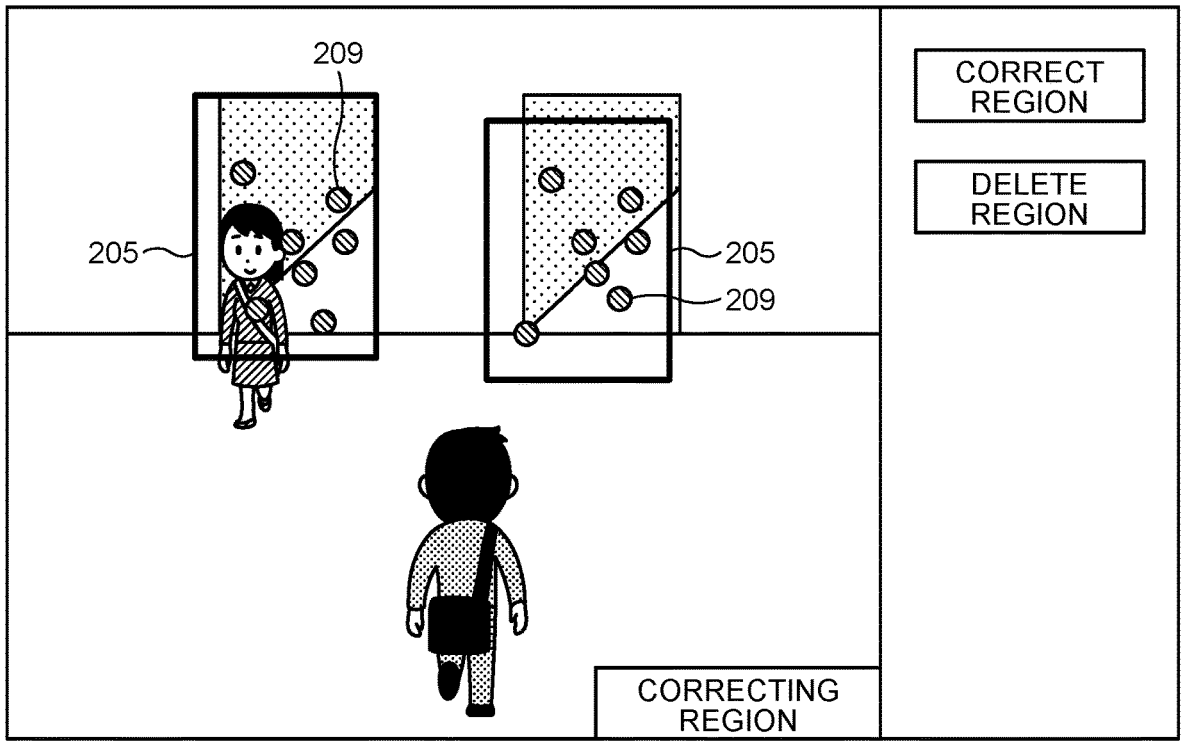
FIG. 16 is a diagram for describing Example 1 of displayed information according to the fourth embodiment.

FIG. 16 is a diagram for describing Example 1 of displayed information according to the fourth embodiment. FIG. 16 illustrates an example of displayed information displaying the determination region 205. In the example illustrated in FIG. 16, the display unit 6 displays the determination region 205 in such a manner as to be superimposed onto a camera image. In a case where the determination region 205 is not a rectangle, the display unit 6 may display the determination region 205 in a shape such as an ellipse. In addition, the display unit 6 may also display a coordinate 209 at which a state change event of a tracking trajectory 201 used in estimation has occurred.

A display GUI of the determination region 205 includes buttons of the correction and deletion of a region, enabling/disabling choice, and the like.

In the correction of a region, for example, if the determination region 205 is a rectangle, by making positions of an upper left coordinate and un upper right coordinate adjustable using the GUI, a rectangle position is made correctable.

In the deletion of a determination region, the determination region 205 to be deleted is made selectable using a graphical user interface (GUI) for selecting the determination region 205, and the region is made deletable by pressing a deletion button. At this time, the display unit 6 may also delete the coordinate 209 at which a state change event of the tracking trajectory 201 used in estimation of the determination region 205 has occurred, from displayed information.

In the enabling/disabling choice, by selecting the determination region 205 and pressing an enabling/disabling button, an enabled/disabled state can be toggled. Alternatively, the display unit 6 may display an enabled state or a disabled state on a screen in the form of a checkbox when a region is selected, and switch the state by receiving the selection of the checkbox from a user.

By the displayed information as illustrated in FIG. 16, the determination region 205 can be checked, and it becomes possible for the user to correct, delete, and select the determination region 205 that has been erroneously estimated.

Figure 17:
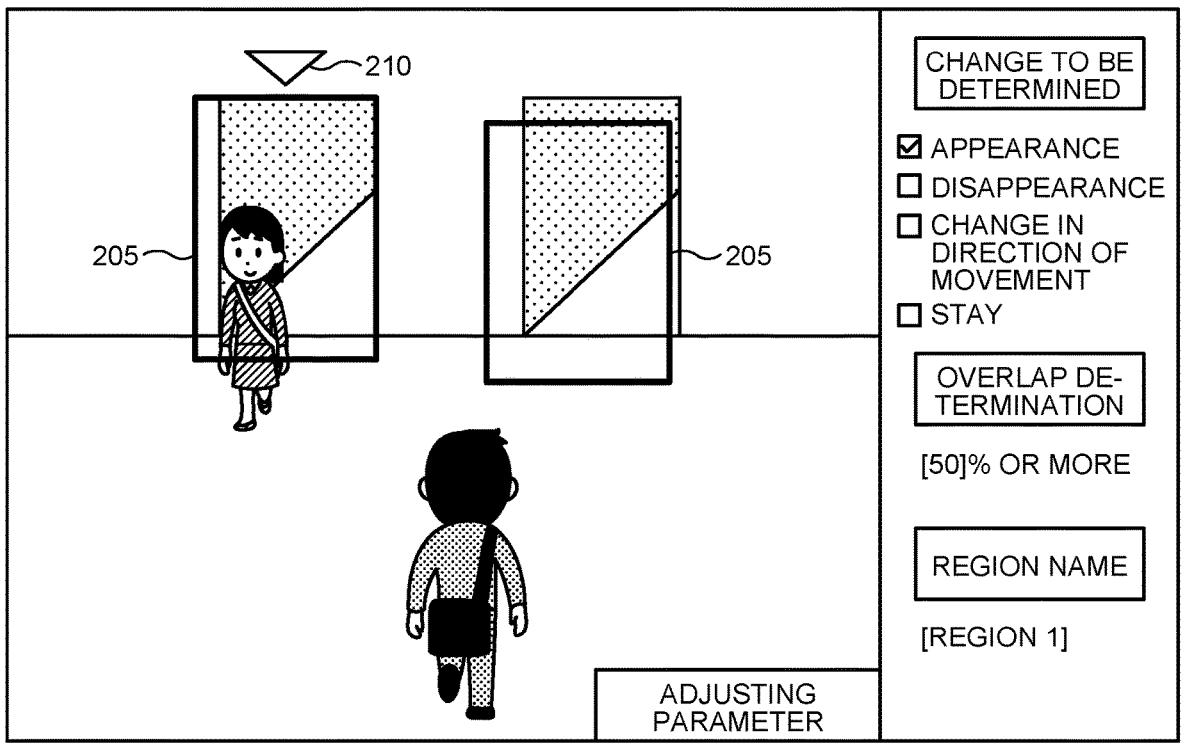
FIG. 17 is a diagram for describing Example 2 of displayed information according to the fourth embodiment.

FIG. 17 is a diagram for describing Example 2 of displayed information according to the fourth embodiment. FIG. 17 illustrates an example of a GUI for setting a parameter of the determination region 205. First of all, the display unit 6 receives region selection 210 from the user, and displays a parameter set for the selected determination region 205.

As a parameter for determining the tracking trajectory 201, the display unit 6 displays displayed information that makes a state change event such as an appearance, a disappearance, a bend, and a stay selectable using a checkbox.

In a case where a checked state change event has occurred in the determination region 205, the first determination unit 4 performs determination processing.

In addition, the display unit 6 may display displayed information further including a checkbox for enabling a setting of performing determination processing in a case where a detected region of a deleted person overlaps the determination region 205, without using a state change event.

In a case where the first determination unit 4 determines whether or not a detected region of a person has entered the determination region 205, using an overlap rate of a region (for example, rectangle), a threshold of the overlap rate may be made settable from a GUI.

In addition, the display unit 6 may display a GUI for inputting a region name, for distinguishing between regions.

By the displayed information as illustrated in FIG. 17, a determination method in the determination region 205 can be adjusted to a determination method desired by the user.

Figure 18:
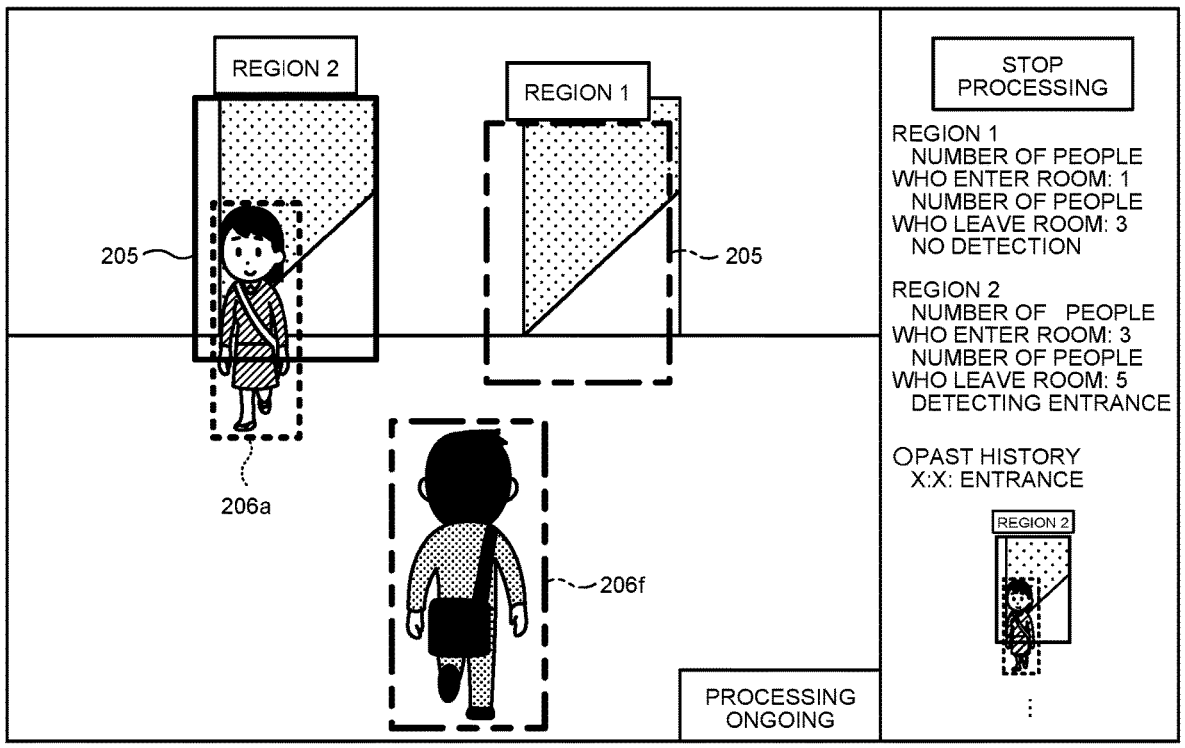
FIG. 18 is a diagram for describing Example 3 of displayed information according to the fourth embodiment.

FIG. 18 is a diagram for describing Example 3 of displayed information according to the fourth embodiment. FIG. 18 illustrates an example of displayed information to be displayed when determination processing in the determination region 205 is being performed. In the example illustrated in FIG. 18, a name of the determination region 205 is displayed, and display indicating the state of the region is separately performed. Information to be displayed as the state of the region is a counted number of each state change event and whether or not entry is detected. In addition, the display unit 6 may display a detected state change event. In addition, the display unit 6 may highlight the determination region 205 in which entry is detected.

In addition, the display unit 6 may display a detection result and a track result of a person in addition to the determination region 205. In addition, the display unit 6 may display, as a past history, an image in which the entry has been detected in the past, and a detection result (for example, "entrance") together with a time.

By the displayed information as illustrated in FIG. 18, a determination status can be displayed in real time to the user.

Figure 19:
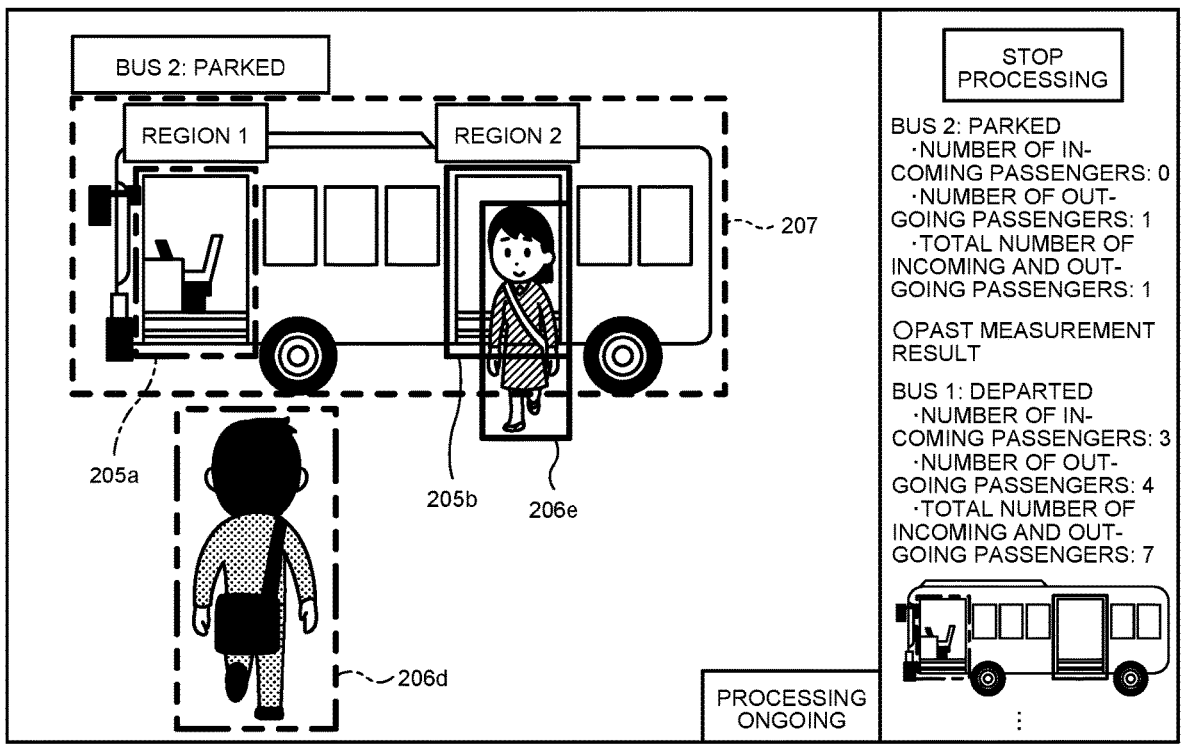
FIG. 19 is a diagram for describing Example 4 of displayed information according to the fourth embodiment.

FIG. 19 is a diagram for describing Example 4 of displayed information according to the fourth embodiment. FIG. 19 illustrates a display example of a case of detecting the entry of a person by obtaining the determination regions 205a and 205b from a detected region (detection rectangle 207) of a moving object such as a bus. FIG. 19 differs from FIG. 18 in that the display unit 6 displays the detection rectangle 207 of the moving object, and the state thereof (for example, "parked"). In addition, the display unit 6 may also display the state of the moving object ("parked" and "departed") in the display of a determination result such as count.

By the displayed information as illustrated in FIG. 19, a determination status can be displayed in real time to the user.

Figure 20:
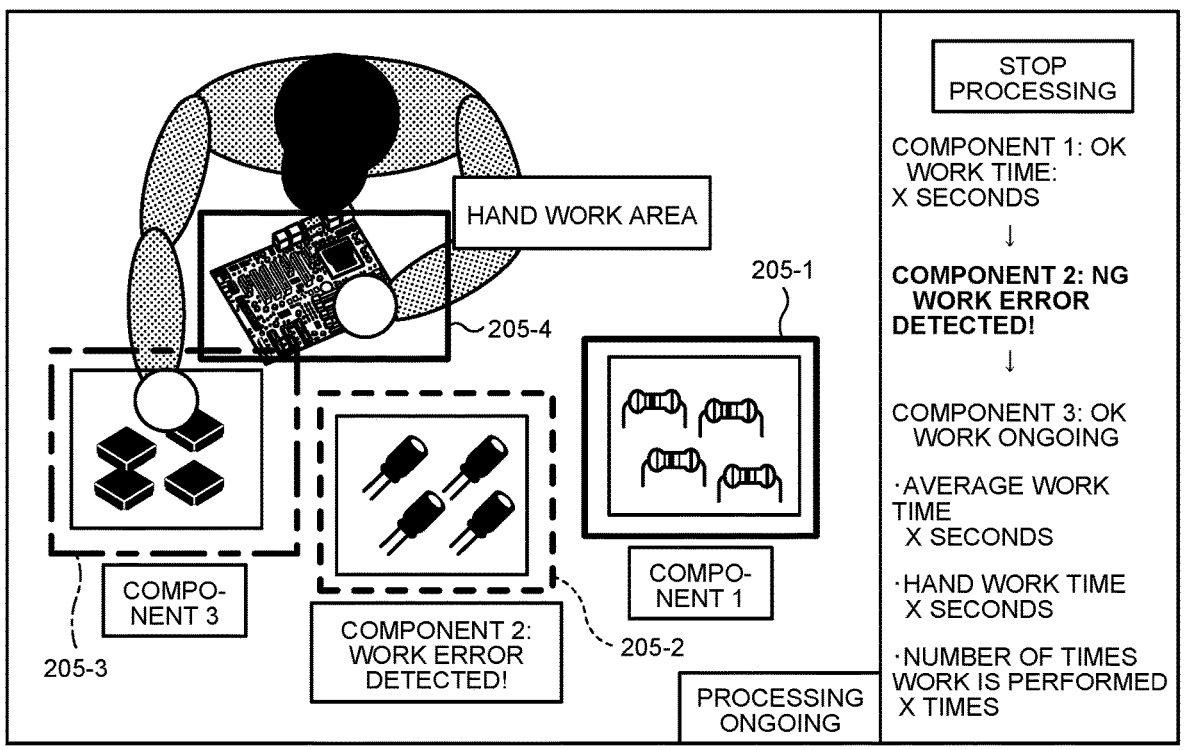
FIG. 20 is a diagram for describing Example 5 of displayed information according to the fourth embodiment.

FIG. 20 is a diagram for describing Example 5 of displayed information according to the fourth embodiment. FIG. 20 illustrates a display example of a processing result in work analysis. In the display for work analysis, the display unit 6 performs display indicating an entry order of a hand, in a message space indicating a work state.

In addition, the display unit 6 also displays an average work time, a hand work time, the number of times a work is performed, and the like. The average work time indicates average hours required for a hand taking a round in an entry order. The hand work time indicates hours during which both hands remain in a work area at hand. The number of times a work is performed indicates the number of times a hand takes a round in an entry order.

In addition, in a case where an entry order of the hand into component regions (the determination regions 205-1 to 205-3) is not a specified order, the display unit 6 displays that a work error has been detected. As in the example illustrated in FIG. 20, in a case where the entry not following the specified order is detected in the determination region 205-3, the display unit 6 highlights the skipped determination region 205-2 and displays a message indicating that work error has been detected. In addition, the display unit 6 also performs similar display in a message space indicating a work state.

The display unit 6 may list-display, as a graph, a work time and the number of times a work is performed, together with an image capturing time of an image.

By the displayed information as illustrated in FIG. 19, a work time in each work is visualized, a bottleneck in a work becomes clear, and a work error can be detected.

Lastly, an example of a hardware configuration of the estimation apparatuses 100 to 100-4 according to the first to fourth embodiments will be described.

Example of Hardware Configuration

Figure 21:
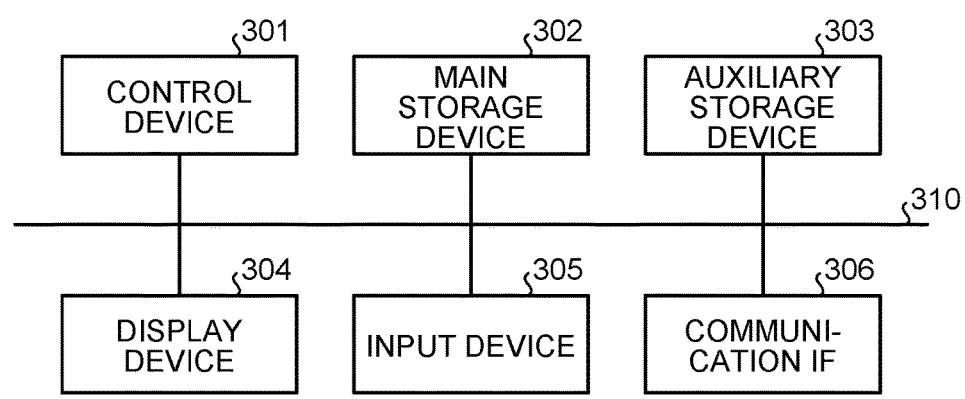
FIG. 21 is a diagram illustrating an example of a hardware configuration of the estimation apparatuses according to the first to fourth embodiments.

FIG. 21 is a diagram illustrating an example of a hardware configuration of the estimation apparatuses 100 to 100-4 according to the first to fourth embodiments.

The estimation apparatuses 100 to 100-4 include a control device 301, a main storage device 302, an auxiliary storage device 303, a display device 304, an input device 305, and a communication IF 306. The control device 301, the main storage device 302, the auxiliary storage device 303, the display device 304, the input device 305, and the communication IF 306 are connected via a bus 310.

The control device 301 executes a program loaded from the auxiliary storage device 303 onto the main storage device 302. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays displayed information. The display device 304 is a liquid crystal display or the like, for example. The input device 305 is an interface for operating a computer to be operates as the estimation apparatuses 100 to 100-4. The input device 305 is a keyboard, a mouse, or the like, for example. Note that the display device 304 and the input device 305 may use a display function and an input function of an external management terminal or the like that is connectable with the estimation apparatuses 100 to 100-4.

The communication IF 306 is an interface for communicating with another apparatus.

Programs executed by a computer are provided as computer program products with being recorded on a computer-readable storage medium such as a CD-ROM, a memory card, a CD-R, and a digital versatile disc (DVD), in files having an installable format or an executable format.

In addition, programs executed by the computer may be stored in a computer connected to a network such as the Internet, and provided by being downloaded via the network. In addition, programs executed by the computer may be provided via a network such as the Internet without being downloaded.

In addition, programs executed by the computer may be provided with being preinstalled on a ROM or the like.

Programs to be executed by the computer have a module configuration including a functional block executable also by programs, among functional configurations (functional blocks) of the above-described estimation apparatuses 100 to 100-4. As actual hardware, each of the above-described functional blocks is loaded onto the main storage device 302 by the control device 301 reading out a program from a storage medium and executing the program. In other words, each of the above-described functional blocks is generated on the main storage device 302.

Note that part of all of the above-described functional blocks may be implemented by hardware such as an integrated circuit (IC) without being implemented by software.

In addition, in the case of implementing each function using a plurality of processors, each processor may implement one of the functions, or may implement two or more of the functions.

In addition, operation configurations of the estimation apparatuses 100 to 100-4 according to the first to fourth embodiments may be arbitrary. The estimation apparatuses 100 to 100-4 according to the first to fourth embodiments may be operated as an apparatus included in a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation apparatus comprising:
one or more hardware processors configured to:
detect a first object included in time-series images, and generate a tracking trajectory of the first object;
detect a state change event indicating an appearance, a disappearance, a bend, or a stay of the tracking trajectory, and extract a coordinate of the first object in which the state change event has occurred; and
estimate a determination region based on the coordinate, wherein
the one or more hardware processors are further configured to:
perform at least one of processing of determining whether or not the first object has entered the determination region from outside the determination region, and processing of determining whether or not the state change event in the determination region has occurred, the first object being a person,
generate a tracking trajectory of a skeletal point of the person, and
estimate the determination region including a one hand region in which a state change event of only a skeletal point included in one hand of the person occurs, and a both hand region in which a state change event of skeletal points of both hands of the person occurs.

2. The apparatus according to claim 1, wherein the one or more hardware processors are configured to detect a second object having a type different from the first object, and further generate a tracking trajectory of the second object,
wherein the one or more hardware processors are further configured to determine a movement of the second object based on a tracking trajectory of the second object, and
wherein the one or more hardware processors are configured to extract a coordinate of the first object where the state change event has occurred within a detected region of the second object, in a case where the state change event for the second object is detected as a stationary state.

3. The apparatus according to claim 2, wherein the one or more hardware processors are configured to reset the determination region, in a case where the second object has started to move from the stationary state.

4. The apparatus according to claim 1, wherein the one or more hardware processors are configured to not perform detection of the state change event, in a case where a distance between the first object and a third object is smaller than a second threshold.

5. The apparatus according to claim 1, wherein the one or more hardware processors are configured to
estimate an order in which entry of a skeletal point of the person or a state change event occurs in the one hand region and the both hand region, and
determine whether or not entry or a state change event occurs in accordance with the order.

6. The apparatus according to claim 1, wherein the one or more hardware processors are further configured to display displayed information for receiving operations of correction of the determination region, choice to enable or disable the determination region, and reset of the determination region.

7. The apparatus according to claim 6, wherein the one or more hardware processors are configured to display, on the display unit, at least one of a number of times the first object has entered the determination region from outside the determination region, and a number of times the state change event in the determination region has occurred.

8. The apparatus according to claim 6, wherein the one or more hardware processors are further configured to display displayed information for receiving operations of choice to enable or disable extraction of the appearance of the tracking trajectory, choice to enable or disable extraction of the disappearance of the tracking trajectory, choice to enable or disable extraction of the bend of the tracking trajectory, and choice to enable or disable extraction of the stay of the tracking trajectory.

9. The apparatus according to claim 1, wherein the one or more hardware processors are configured to not perform extraction of the coordinate at image ends of the time-series images.

10. The apparatus according to claim 1, wherein the one or more hardware processors are configured to perform clustering of regions extracted based on the coordinate including a coordinate or a plurality of coordinates, and estimates the determination region from a sample region classified by the clustering.

11. An estimation method comprising:
detecting a first object included in time-series images, and generating a tracking trajectory of the first object;
detecting a state change event indicating an appearance, a disappearance, a bend, or a stay of the tracking trajectory, and extracting a coordinate of the first object in which the state change event has occurred; and
estimating a determination region based on the coordinate, wherein
the method further comprises:
performing at least one of processing of determining whether or not the first object has entered the determination region from outside the determination region, and processing of determining whether or not the state change event in the determination region has occurred, the first object being a person;
generating a tracking trajectory of a skeletal point of the person; and
estimating the determination region including a one hand region in which a state change event of only a skeletal point included in one hand of the person occurs, and a both hand region in which a state change event of skeletal points of both hands of the person occurs.

12. The method according to claim 11, further comprising:
detecting a second object having a type different from the first object, and further generating a tracking trajectory of the second object; and
determining a movement of the second object based on a tracking trajectory of the second object, and
wherein the extracting the coordinate of the first object includes extracting a coordinate of the first object where the state change event has occurred within a detected region of the second object, in a case where the state change event for the second object is detected as a stationary state.

13. The method according to claim 12, wherein the estimating the determination region includes resetting the determination region, in a case where the second object has started to move from the stationary state.

14. A computer program product comprising a non-transitory computer-readable medium including programmed instructions, the instructions causing a computer to function as:
a tracking unit configured to detect a first object included in time-series images, and generate a tracking trajectory of the first object;
an extraction unit configured to detect a state change event indicating an appearance, a disappearance, a bend, or a stay of the tracking trajectory, and extract a coordinate of the first object in which the state change event has occurred;
an estimation unit configured to estimate a determination region based on the coordinate; and
a first determination unit configured to:
perform at least one of processing of determining whether or not the first object has entered the determination region from outside the determination region, and processing of determining whether or not the state change event in the determination region has occurred, the first object being a person, wherein
the tracking unit generates a tracking trajectory of a skeletal point of the person, and
the estimation unit estimates the determination region including a one hand region in which a state change event of only a skeletal point included in one hand of the person occurs, and a both hand region in which a state change event of skeletal points of both hands of the person occurs.

15. The computer program product according to claim 14, wherein
the tracking unit detects a second object having a type different from the first object, and further generates a tracking trajectory of the second object, the instructions cause the computer to further function as
a second determination unit configured to determine a movement of the second object based on a tracking trajectory of the second object, and the extraction unit extracts a coordinate of the first object where the state change event has occurred within a detected region of the second object, in a case where the state change event for the second object is detected as a stationary state.

16. The computer program product according to claim 15, wherein the estimation unit resets the determination region, in a case where the second object has started to move from the stationary state.

* * * * *